United States Patent [19]

Billet

[11] Patent Number: 4,502,198
[45] Date of Patent: Mar. 5, 1985

[54] METHOD OF RECONDITIONING A DIAPHRAGM FRICTION CLUTCH AND RECONDITIONABLE CLUTCH MECHANISM

[75] Inventor: René Billet, Lamorlaye, France

[73] Assignee: Societe Anonyme Francaise Du Ferodo, Paris, France

[21] Appl. No.: 20,071

[22] Filed: Mar. 13, 1979

[30] Foreign Application Priority Data

Mar. 24, 1978 [FR] France ........................... 78 08724

[51] Int. Cl.³ .......................... F16D 13/64; B23P 6/00
[52] U.S. Cl. ................................................ 29/402.08
[58] Field of Search .................... 29/402.03–402.08; 192/89 B

[56] References Cited

U.S. PATENT DOCUMENTS

| 3,773,155 | 11/1973 | Fujita et al. | 192/89 B X |
| 3,939,815 | 2/1976 | Spivey | 29/402.08 X |
| 3,939,951 | 2/1976 | Sink et al. | 192/89 B |
| 4,084,674 | 4/1978 | de Gennes | 192/89 B |

FOREIGN PATENT DOCUMENTS 2205456 8/1973 Fed. Rep. of Germany .
1519703 2/1968 France .
1524350 4/1968 France .
2334009 7/1977 France .
961405 6/1964 United Kingdom .

*Primary Examiner*—Kenneth J. Ramsey
*Attorney, Agent, or Firm*—Charles E. Brown

[57] ABSTRACT

A reconditionable friction clutch is disclosed of the type comprising a cover member having integrally formed lugs along its inner peripheral zone for rockably mounting the diaphragm spring on the cover member. Since these original lugs cannot be reused to rockably mount the diaphragm spring once they are disengaged to gain access to the diaphragm spring, they are replaced after reconditioning the clutch. The radial portions of the lugs are removed, the lugs being severed so that their axial portions are long enough to be received in passages in the diaphragm spring or a new diaphragm spring to recenter the same. Apertures preferably in tabs alternating with the original lugs are formed to accommodate replacement assembly means which may be of the lug or clip type or of the pin type. Such apertures are formed in the cover member either during manufacture of the clutch or at the time of reconditioning it.

4 Claims, 18 Drawing Figures

METHOD OF RECONDITIONING A DIAPHRAGM FRICTION CLUTCH AND RECONDITIONABLE CLUTCH MECHANISM

The present invention relates generally to the reconditioning of clutches, especially automotive clutches, after an initial period of service.

The invention relates more particularly to diaphragm friction clutches of the kind comprising a first annular part or cover member, a second annular part or diaphragm spring having peripheral portion forming a Belleville washer and a central portion divided into radial fingers. Assembly means rockably mount the diaphragm spring on the cover member and comprise together with a third annular part or pressure plate which is attached to the cover member by straps while being axially movable relative thereto, the peripheral portion of the diaphragm spring bearing against the pressure plate. The unitary subassembly comprised by the foregoing parts forms a clutch mechanism which is assembled before it is incorporated into the rest of the clutch.

As is known, the reconditioning of a clutch essentially concerns the clutch mechanisms, apart from the possible reconditioning or change of the friction disc or clutch plate interposed between the clutch mechanism and the reaction plate of flywheel against which the latter bears.

Such a reconditioning of a clutch cannot normally be satisfied by merely resurfacing the face of the pressure plate in contact with the friction disc, and/or merely reloading the radial fingers of the diaphragm spring to overcome the consequences of wear of the pressure plate and the radial fingers of the diaphragm spring, and/or merely replacing the straps attaching the pressure plate to the diaphragm spring which might have been damaged. On the contrary the reconditioning of such a clutch requires dismantling the diaphragm spring in order to check and clean the support surfaces and, optionally, the check whether the replacement of the diaphragm spring is necessary.

Until very recently the assembly means for rockably mounting the cover member comprised pins of various types riveted at one of their ends to the cover having, for example, a stamped portion forming a rocking support for the diaphragm spring through openings therein and providing at their other ends a rocking support for the diaphragm spring, which could be direct or indirect, after passing through the passages in the diaphragm spring between the radial fingers and at the bases thereof.

With such clutches the dismantling of the diaphragm spring did not cause any difficulties, nor did the reassembly of the diaphragm spring or a new diaphragm spring in its place.

In fact all that was necessary for dismantling the clutch was to remove the pins by boring or pulling them out and then for reassembly it was to put new pins in the place in the original openings in the cover member freed by the removal of the original pins.

Now, in the last few years a new type of clutch has been developed in which the assembly means rockably mounting the diaphragm spring on the cover member comprised lugs which are formed integrally with the cover member, by cutting out and folding or bending at least part of the inner peripheral region of the cover member and after the lugs pass through passages defined between the radial fingers of the diaphragm spring and at the bases thereof. Each of the lugs has a substantially radially bent end portion for effectively bearing against the peripheral portion of the diaphragm spring, that is, directly, or indirectly through the intermediary of a toric ring or a bearing washer.

To recondition such clutches it has been proposed, notably in U.K. patent specification No. 45,500/1975 filed on Dec. 3, 1975, now U.K. Pat. No. 1,562,795 granted Mar. 19, 1980, and its French equivalent Pat. No. 2,334,009 published July 1, 1977, to eliminate at least part or each of the lugs comprising the assembly means which rockably mount the diaphragm spring to afford access to the diaphragm spring and remove the latter, then after reassembly to substitute for the assembly means which are thenceforth out of service new assembly means bearing on the annular region formed by the inner periphery of the cover member.

Such a method has various drawbacks. First of all, since it is plain that the new assembly means have to pass around the edges of the inner periphery of the cover member the new assembly means imperatively are of the lug or clip type and may not be of the pin type, limited possibilities being available for choosing between the various assembly means suitable for use.

In practice such assembly means may only be constituted by a single annular part, the use of individual or separate clips, although a theoretical possibility, is proscribed by reason of the problems of suitable radial maintenance of the clips.

Further, the lugs of the original assembly means ensure, during assembly, centering and maintaining of the diaphragm spring as well as centering and maintaining any bearing member interposed between the end portions of the lugs and the diaphragm spring for an indirect bearing relationship.

As the lugs have been eliminated or at least as indicated in the aforesaid U.K. patent specification the portion of the lugs adapted to pass through the diaphragm spring, the centering of the diaphragm spring is not accomplished by the same.

According to the invention there is provided in a first aspect, a method of reconditioning a diaphragm friction clutch comprising an annular cover member, an annular diaphragm spring having a peripheral portion formed as a Belleville washer and a central portion divided into radial fingers, and assembly means for rockably mounting the diaphragm spring on the cover member, the assembly means comprising lugs internally formed with the cover member, the lugs passing through passages defined between the radial fingers at the bases thereof and have substantially radially bent end portions which effectively bear against the peripheral portion of the diaphragm; wherein the method comprises steps of disengaging each of the lugs so as to afford access to the diaphragm spring for checking or changing it, then remounting the original diaphragm spring or a new diaphragm spring, providing new assembly means for rockably mounting the diaphragm spring, characterized by inserting the new assembly means in a corresponding plurality or apertures formed in the cover member for that purpose.

Owing to such apertures which, in practice, alternate with the lugs of the original assembly means it is possible, depending on the conditions to substitute assembly means of the same type, that is, lug or clip type assembly means, as the original lugs, either carried by an annular head or individual lugs or clips, or even different assembly means, such as pins. To this end it suffices to provide apertures of a suitable contour, rectangular in the first instance and circular in the second. In any event the apertures permit suitable radial maintenance of the assembly means passing therethrough.

In order to carry out the method according to the invention the apertures may be formed as desired in the cover member at the time of reconditioning the clutch. Alternatively, these apertures may be formed beforehand in the cover member concerned.

For this purpose the present invention also consists in a reconditionable clutch mechanism and a diaphragm friction clutch having a cover member in which such apertures are provided before reconditioning. In this case these apertures obviously have from the outset a predetermined contour corresponding to the type of replacement assembly means, that is, with lugs or clips, or with pins.

In any event the disengagement of the lugs of the original assembly means to afford access to the diaphragm spring may be accomplished by unbending or straightening the original lugs. Though, preferably, the original lugs are severed to remove the radially bent end portions.

However, according to a preferred arrangement at least some of the axial portions of the lugs remain, which are long enough to be received, upon reassembly, in the passages in the associated new or original diaphragm spring for centering the latter.

In the practice the entire axial portions of the lugs concerned are retained for ensuring not only the centering of the diaphragm spring but also the centering of the optional bearing washer which is customarily associated therewith.

These and other features and advantages of the invention will be brought out in the description which follows, by way of example, reference being had to the accompanying diagrammatic figures, in which.

Figure 6:
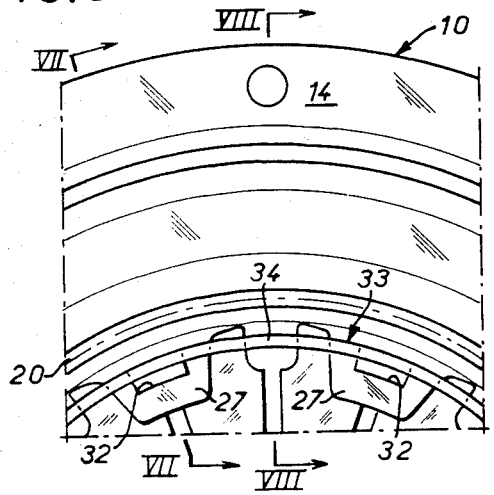
FIG. 6 is a fragmentary elevational view of a reconditioned clutch mechanism embodying the invention.
Figure 7:
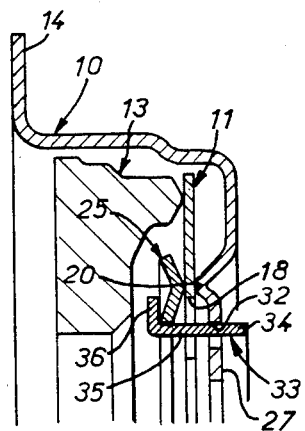
FIGS. 7 and 8 are fragmentary sectional view taken on the line VII—VII and VIII—VIII in FIG. 6.
Figure 9:
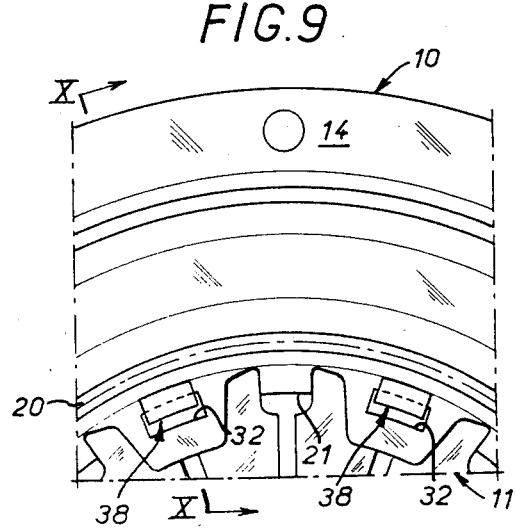
Figure 10:
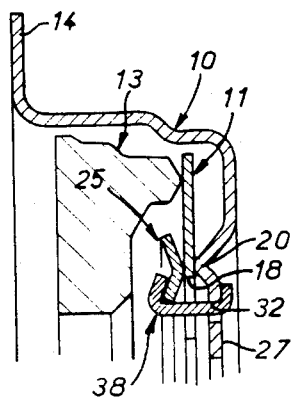
Figure 11:
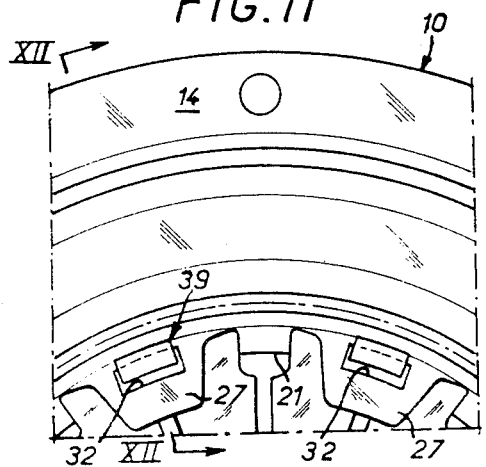
Figure 12:
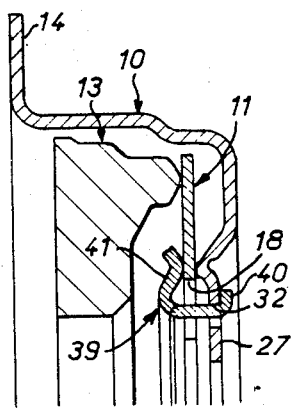

FIGS. 9 and 10, on the one hand, and FIGS. 11 and 12 on the other, are views similar to FIGS. 6 and 7 respectively, relative to other embodiments of the invention.

Figure 1:
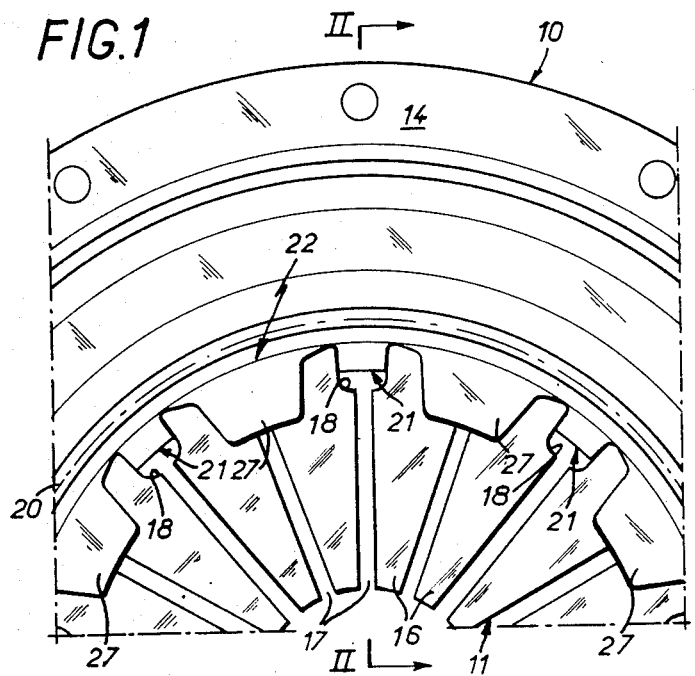
FIG. 1 is a fragmentary elevational view of a friction clutch mechanism to be reconditioned.
Figure 4:
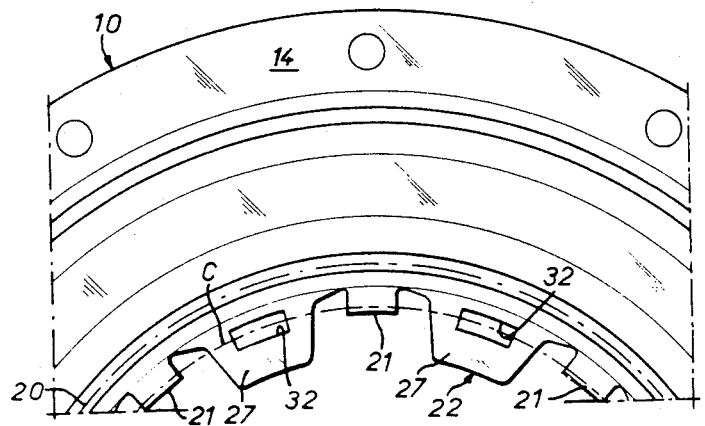
FIG. 4 is a fragmentary elevational view of the cover member after cutting apertures therein.
Figure 13:
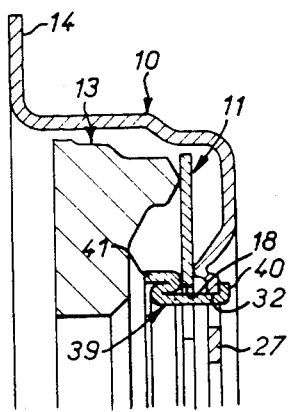
Figure 14:
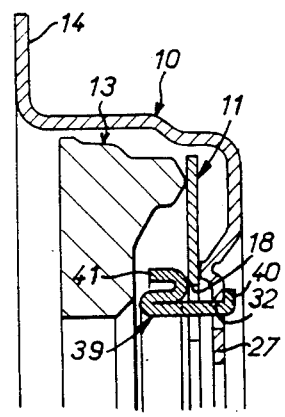
Figure 15:
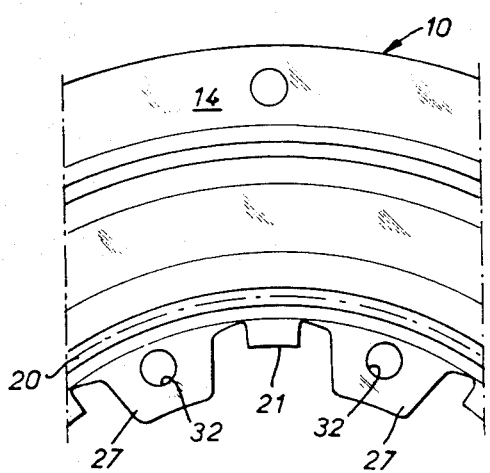
Figure 16:
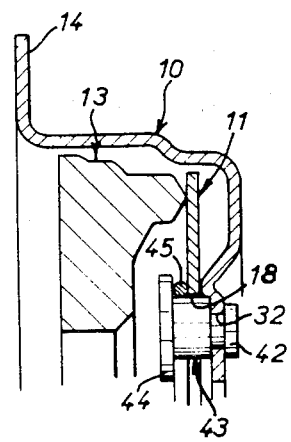
Figure 17:
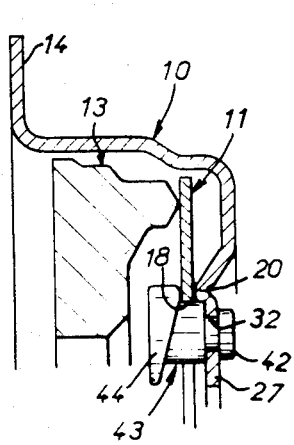
Figure 18:
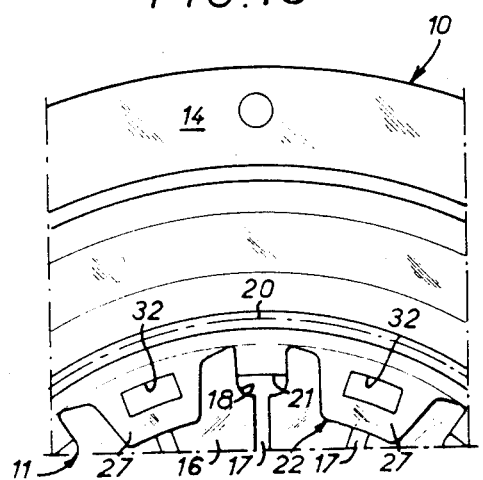

FIGS. 13 and 14 are views similar to FIG. 12 for other modified embodiments according to the invention;

FIG. 15 is a view similar to FIG. 4 illustrating another cover member with a different type of aperture therein;

FIG. 16 is a longitudinal sectional view of a clutch mechanism which is reconditioned in accordance with the cover member illustrated in FIG. 15;

FIG. 17 is a view similar to FIG. 16 for an alternative embodiment for the cover member of FIG. 15; and FIG. 18 is a fragmentary elevational view similar to FIG. 1 for a clutch mechanism comprising originally formed apertures adapted to facilitate the reconditioning of the clutch mechanism.

Figure 2:
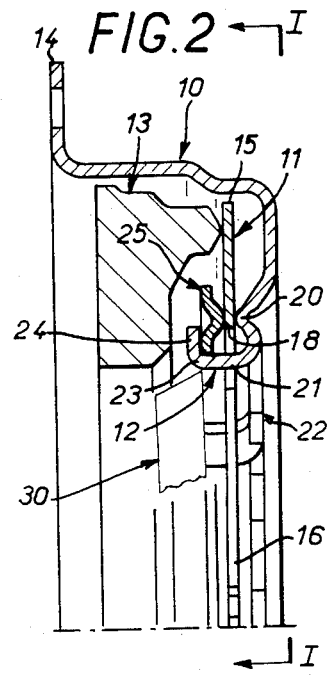
FIG. 2 is an axial cross-sectional view of the clutch mechanism taken on the line II—II in FIG. 1.

In FIGS. 1 and 2 the reader will recognize a diaphragm friction clutch mechanism. Such a mechanism generally comprises a first annular part of cover member 10, a second annular part or diaphragm spring 11, assembly means rockably mounting the diaphragm spring 11 on the cover member 10 and a third annular part or pressure plate 13.

The outer periphery 14 of the cover member 10 is adapted to be mounted on a rection plate or flywheel (not shown), which is not part of the clutch mechanism, after a friction disc or clutch plate (also not shown) has been interposed between the pressure plate and the reaction plate or flywheel.

The pressure plate 13 is attached for rotation with the cover member 10 by straps (not shown in the drawings) which are disposed tangentially relative to the clutch mechanism and permit relative axial movements of the pressure plate 13 with respect to the cover member 10.

The diaphragm spring 11 comprises an outer, peripheral portion 15 formed as a Belleville washer and a central portion divided into radial flanges 16 separated by slots 17 which at the bases of the radial fingers widen into passages 18. The diaphragm spring 11 bears by its outer peripheral portion 15 on one side against the pressure plate 13 and on the other side against by cover member 10. In the illustrated embodiment the diaphragm spring 11 bears directly against the cover member 10 which for this purpose has a stamped bead 20 in the vicinity of its inner periphery.

The assembly means 12 rockably mounting the diaphragm spring 11 on the cover member 10 comprise lugs 21 which are formed integrally, in one piece, with the cover member 10 from the same blank and are cut out and bent at the inner peripheral zone 22 of the cover member 10. After passing through the passages 18 in the diaphragm spring 11 the lugs 21 comprise a bending zone 23 and a substantially radially bent end portion 24 for bearing on the peripheral portion 15 of the diaphragm spring 11.

In the illustrated embodiment the lugs 12 bear indirectly against the diaphragm spring through the intermediary of a bearing ring or washer 25 of generally flattened V-shaped cross-section. The bearing washer 25 bears along the rounded annular peak against the peripheral portion 15 of the diaphragm spring 11 in line with the bead 20 on the cover member 10 and is engaged by the radial end portions 24 of the lugs 21 along its inner periphery.

In the illustrated embodiment the lugs 21 alternate with tabs 27 which are formed along the inner peripheral zone 22 of the cover member 10 and protrude substantially radially. The tabs 27 are the parts of the inner peripheral zone 22 of the cover member 10 that remain after the lugs 21 are severed, in which case the lugs 21 are severed right to the inner peripheral edge of the cover member 10. Yet, obviously the lugs 21 may be severed at a distance from the inner peripheral edge of cover member 10 so that the inner peripheral edge remains unchanged, the tabs 27 remaining interconnected by the inner peripheral edge. The tabs 27 serve as supports for the radial fingers 16 of the diaphragm spring 11 before it is loaded when the clutch mechanism as a whole is mounted on the reaction plate of flywheel.

These arrangements are moreover well known per se and need not be described in detail herein.

It will be assumed that after an initial period of service the clutch mechanism has to be reconditioned. Such a reconditioning comprises, after separating the pressure plate 13 from the cover member 10 by disconnecting the straps which connect the two, acting on or disengaging the lugs 21 so as to afford access to the diaphragm spring for checking its bearing surfaces or changing the diaphragm spring.

Figure 3:
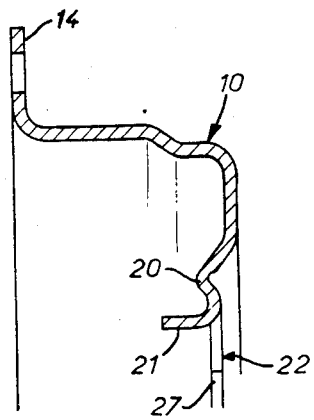
FIG. 3 is a fragmentary axial sectional view of the cover member of the clutch mechanism after removal of the other parts thereof.
Figure 5:
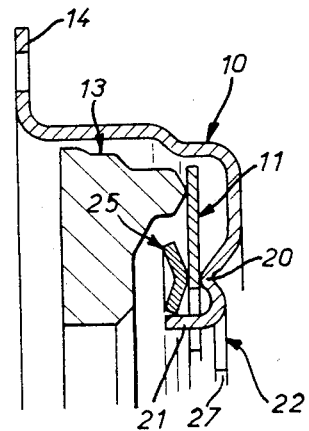
FIG. 5 is a view similar to FIG. 3 after the reassembly of various annular parts of the clutch mechanism.

For example, as illustrated in FIG. 2, each of the lugs 21 is severed by means of a cutting tool 30 to remove its radial end portion 24. Preferably, as shown, there remains the entire axial portion of each lug 21, the lugs being severed at their bending zones 23, FIGS. 2 and 3.

In the inner peripheral zone 22 of the cover member thus freed which may be considered to be limited radially outwardly by the inner side of the bead 20 thereon, a plurality of apertures 32 are provided, see FIG. 4.

In the illustrated embodiment of FIG. 4 the apertures 32 are provided in the radial tabs 27 on the cover member 10 lying on a circle C the diameter of which is substantially equal to the circle along which lie the severed ends of the assembly lugs 21 which alternate therewith.

In the embodiment illustrated in FIGS. 4–8 where the original lugs are to be replaced by new lug type assembly means the apertures 32 are of generally rectangular contour, elongated generally along the circumference of the circle C which passes through the middle thereof.

Figure 8:
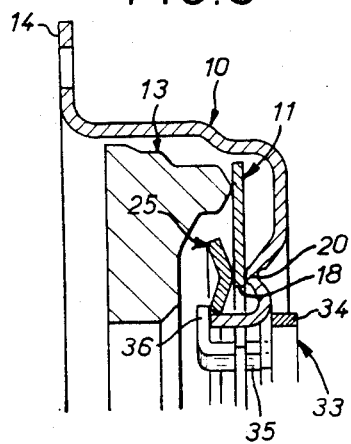

In the embodiment illustrated in FIGS. 6–8 the new lug type assembly means are as described in the U.S. Pat. Nos. 4,084,674 or 4,039,059 which are incorporated by reference herein.

The assembly means are formed on a substantially annular member 33 which is either a single continuous circular member or interrupted by a slot or divided into consecutive part-annular sections, comprising simple part-cylindrical supporting portions 23 and lugs 35 axially extending from the supporting portion 34.

In practice the clutch mechanism is reassembled by first remounting the diaphragm spring 11 or a new diaphragm spring, then positioning the bearing washer 25 or, as shown, a new, identical bearing washer 25. The position of the diaphragm spring or the bearing washer whether new or old is facilitated by the remaining axial portions of the original lugs 21 being still long enough to be received in the passages 18 in the diaphragm spring 11 and in the bearing washer 25, thereby ensuring the centering of the diaphragm spring and the bearing washer, see FIG. 5.

The ring member 33 then has its lugs 35 received in the apertures 32 previously formed in the cover member 10 until the supporting portion 34 bears against the cover member intermediate consecutive apertures 32. During engagement of the annular member 33 in apertures 32 the lugs 35 are received in the passages 18 in the diaphragm spring 11 which are in registry with the apertures 32 in the cover member 10 and also in the bearing washer 25. Then the ends of the lugs 35 just have to be bent radially, as at 36 in FIG. 7.

The reassembly of the clutch mechanism is finished by repositioning and attaching the pressure plate by means of the tangential straps in the usual manner, as initially.

In the alternative embodiment of FIGS. 8 and 10 the new assembly means comprise individual lugs or clips 38 both ends of which are bent radially, one in contact with the cover member 10' and the other with the bearing washer 25, also as described in the above-mentioned U.S. Pat. No. 4,084,674 which is incorporated herein by reference.

In the alternative embodiment illustrated in FIGS. 11–14, the new assembly means comprise an annular member 39 provided with lugs 40 but the supporting ring 41 thereof bears against the diaphragm spring 11 directly, as disclosed in the aforesaid U.S. Pat. No. 4,084,674 and U.K. Pat. No. 961,405, which is also incorporated herein by reference.

According to the FIG. 12 embodiment the supporting ring 41 has a V-shaped cross-section and therefore constitutes the equivalent of above described bearing washers.

According to the embodiments of FIGS. 13 and 14 and as described in the above-mentioned U.K. Pat. No. 961,405, the supporting ring 41 is formed by successive U-folds, which are joined together as depicted in FIG. 13; or as shown in FIG. 14, one of them is radially opened.

In any event the lugs 40 of the annular member 39 after passing through the apertures 32 in the cover member 10 are radially bent into contact with the cover member, either radially outwardly, as shown, or radially inwardly.

If desired the new assembly means may even be of the pin type. To this end apertures 32 or circular contour are formed in the radial tabs 27 on the cover member 10, as shown in FIG. 15. The apertures are appropriate for riveting the tail ends 42 of the pins, the head ends 22 are adapted to bear effectively against the diaphragm spring 11, that is, indirectly through the intermediary of a toric ring 45 as shown in FIG. 16, in accordance with the arrangements described in French Pat. No. 1,519,703, or directly as depicted in FIG. 17 according to the arrangements disclosed in French Pat. No. 1,524,350.

Generally speaking, all customary arrangements for rockably mounting the diaphragm spring 11 on the cover member 10 may be employed.

In the foregoing description it has been assumed that the apertures to be pierced in the cover member 10 are provided during the reconditioning of the clutch mechanism. Alternatively, as shown in FIG. 18, such aperture 32 may be provided beforehand, such as during the manufacture of the clutch.

The present invention is not limited to the various described and illustrated embodiments but admits of variations, alternatives and modifications known to those skilled in the art without departing from the scope and spirit of the invention as defined by the appended claims.

What I claim is:

1. Method for reconditioning diaphragm friction clutches of the type comprising an annular cover member, an annular diaphragm spring having a peripheral portion formed as a Belleville washer and a central portion divided into radial fingers, and assembly means rockably mounting the spring on the cover member, the assembly means comprising lugs formed integrally with the cover member and passing through passages formed at the bases of the radial fingers and therebetween, the lugs having bent end portions effectively bearing against the peripheral portion of the diaphragm spring; wherein said method comprises the steps of disengaging the lugs so as to afford access to the diaphragm spring, providing new assembly means for selectively rockably mounting either the original diaphragm spring or a new diaphragm spring and inserting said new assembly means through a plurality of apertures formed in the cover member in circumferentially spaced relation to said lugs on a circle along which said lugs lie, securing said new assembly means to the cover member, and severing the lugs to remove their radial end portions so that the remaining axial portions of the lugs are long enough to be received in the passages of the original diaphragm spring or the new diaphragm spring once the clutch is reassembled for radially supporting and centering the diaphragm spring.

2. Method for reconditioning diaphragm friction clutches of the type comprising an annular cover member, an annular diaphragm spring having a peripheral portion formed as a Belleville washer and a central portion divided into radial fingers, and assembly means rockably mounting the spring on the cover member, the assembly means comprising lugs formed integrally with the cover member and passing through passages formed at the bases of the radial fingers and therebetween, the lugs having bent end portions effectively bearing against the peripheral portion of the diaphragm spring; wherein said method comprises the steps of disengaging the lugs so as to afford access to the diaphragm spring, providing new assembly means for selectively rockably mounting either the original diaphragm spring or a new diaphragm spring and inserting said new assembly means through a plurality of apertures formed in the cover member in circumferentially spaced relation to said lugs on a circle along which said lugs lie, securing said new assembly means to the cover member, forming the plurality apertures in the cover member at the time of reconditioning the clutch, and severing the lugs to remove their radial end portions so that the remaining axial portions of the lugs are long enough to be received in the passages for the original diaphragm spring or the new diaphragm spring once the clutch is reassembled for radially supporting and centering the diaphragm spring.

3. The method according to claim 1, severing the radial end portions so that the entire axial portions of the lugs remain.

4. The method according to claim 2, severing the radial end portions so that the entire axial portions of the lugs remain.

* * * * *